(12) United States Patent
Park

(10) Patent No.: US 8,727,623 B2
(45) Date of Patent: May 20, 2014

(54) SPINDLE MOTOR

(75) Inventor: Young Ha Park, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 46 days.

(21) Appl. No.: 13/211,194

(22) Filed: Aug. 16, 2011

(65) Prior Publication Data

US 2012/0051677 A1    Mar. 1, 2012

(30) Foreign Application Priority Data

Aug. 26, 2010    (KR) .................. 10-2010-0082956

(51) Int. Cl.
*F16C 32/06*    (2006.01)
(52) U.S. Cl.
USPC ............................................. 384/123
(58) Field of Classification Search
USPC ............................. 74/504; 384/100, 112, 123
See application file for complete search history.

(56) References Cited

U.S. PATENT DOCUMENTS

| | | | | |
|---|---|---|---|---|
| 4,772,188 | A * | 9/1988 | Kimura et al. | 418/55.6 |
| 7,011,450 | B2 * | 3/2006 | Kusaka et al. | 384/107 |
| 7,726,881 | B2 * | 6/2010 | Hamada et al. | 384/112 |
| 2007/0047857 | A1 * | 3/2007 | Hamada et al. | 384/100 |

FOREIGN PATENT DOCUMENTS

| | | |
|---|---|---|
| CN | 1919503 A | 2/2007 |
| JP | 02-278007 | 11/1990 |
| JP | 06-189492 | 7/1994 |
| JP | 11-097919 | 10/2000 |
| JP | 11-051043 | 2/2004 |

OTHER PUBLICATIONS

Korean Office Action dated Aug. 29, 2011 issued in connection with corresponding Korean patent application No. 10-210-0082956.
Office Action dated Dec. 4, 2012 for related Japanese Patent Application No. 2011-177077 and its English summary.
Office Action dated Jul. 2, 2013 from corresponding Chinese Patent Application No. 2011-10246644.5 and its English summary provided by the clients.

* cited by examiner

*Primary Examiner* — Vicky Johnson
(74) *Attorney, Agent, or Firm* — Ladas & Parry, LLP

(57) ABSTRACT

Disclosed herein is a spindle motor including a rotating part in which a hub is coupled to a rotating shaft and a fixing part in which a sleeve is coupled to the rotating shaft, wherein the rotating shaft has a thrust hydrodynamic bearing part formed on a lower end thereof, and the thrust hydrodynamic bearing part has a scroll groove formed therein. The thrust hydrodynamic bearing part of the spindle motor is formed in a microgap between a lower portion of the rotating shaft and an upper portion of a support to reduce frictional force, thereby making it possible to increase efficiency in power consumption, assembling accuracy is mitigated, thereby making it possible to increase a degree of freedom in design, the scroll groove is formed in the thrust hydrodynamic bearing part, thereby making it possible to solve problems of rotation unbalance and dynamic pressure unbalance.

5 Claims, 4 Drawing Sheets

SPINDLE MOTOR

CROSS REFERENCE TO RELATED APPLICATION

This application claims the benefit of Korean Patent Application No. 10-2010-0082956, filed on Aug. 26, 2010, entitled "Spindle Motor" which is hereby incorporated by reference in its entirety into this application.

BACKGROUND OF THE INVENTION

1. Technical Field

The present invention relates to a spindle motor.

2. Description of the Related Art

Generally, in a spindle motor used as a driving device of a recording disk such as a hard disk, or the like, lubricating fluid such as oil, or the like, stored in a gap between a shaft and a sleeve during rotation of the motor and a hydrodynamic bearing using dynamic pressure generated by the lubricating fluid have been variously used. In addition, the hydrodynamic bearing is generally configured of a radial bearing part and a thrust bearing part. The radial bearing part has a herringbone groove formed therein to thereby generate dynamic pressure in a journal section, and the thrust bearing part has a herringbone groove or a spiral groove to thereby generate the dynamic pressure in a thrust surface.

However, in the case of the spindle motor according to the prior art, the thrust bearing part is formed in a micro-gap between a lower portion of a hub and an upper portion of the sleeve to lead to large frictional force, thereby causing large power consumption.

Hereinafter, problems of the spindle motor according to the prior art will be described in more detail with reference to the accompanying drawings.

FIG. 1 is a cross-sectional view schematically showing the spindle motor according to the prior art; and FIG. 2 is a cross-sectional view schematically showing a thrust bearing part of the spindle motor according to the prior art. As shown in FIGS. 1 and 2, the spindle motor 100 is configured to include a rotating part including a rotating shaft 110, a hub 120, and a magnet 130, and a fixing part including a sleeve 140, a bracket 150, a stator 160, and a support 170.

The rotating shaft 110 is rotatably supported by the sleeve 140 and has the hub 120 coupled thereto, and the hub 120 has the magnet 130 fixed to an inner circumferential surface thereof.

In addition, the sleeve 140 has the bracket 150 coupled to an outer circumferential surface thereof by press-fitting, adhesion, or the like, the bracket 150 has the stator 160 coupled to an outer circumferential portion thereof by press-fitting, adhesion, or the like, and the support 170 is coupled to the sleeve 140 while supporting the rotating shaft 110.

In the spindle motor 100 configured as described above, a micro-gap is formed between an upper end of the sleeve 140 and a lower end of the hub 120 and is filled with oil as lubricating fluid, such that a thrust hydrodynamic bearing part 180 is formed, and a dynamic pressure generating groove 181 is formed shown in FIG. 2. The dynamic pressure generating groove 181 is formed as a herringbone groove 181 or a spiral groove.

In addition, a micro-gap is formed between an outer circumferential portion of the rotating shaft 110 and an inner circumferential portion of the sleeve 140 and is filled with oil as lubricating fluid, such that a radial hydrodynamic bearing part 190 is formed. The radial hydrodynamic bearing part 190 has a dynamic pressure generating groove formed in a radial direction of the rotating shaft.

Therefore, dynamic pressure unbalance is generated in the thrust hydrodynamic bearing part 180 due to tilting, or the like, of the hub during the assembling of the hub 120 and the sleeve 140. In addition, when pattern unbalance is generated by the herringbone groove 181 or the spiral groove formed in the thrust hydrodynamic bearing part 180, dynamic pressure unbalance is generated. Furthermore, efficiency in power consumption is reduced due to frictional force of the thrust hydrodynamic bearing part 180 implemented to have a wide area.

SUMMARY OF THE INVENTION

The present invention has been made in an effort to provide a spindle motor in which a thrust hydrodynamic bearing part of the spindle motor is formed in a micro-gap between a lower portion of a rotating shaft and an upper portion of a support to reduce frictional force, such that efficiency in power consumption may be increased, assembling accuracy is mitigated, such that a degree of freedom in design may be increased, a scroll groove is formed in the thrust hydrodynamic bearing part, such that problems of rotation unbalance and dynamic pressure unbalance may be solved.

According to a preferred embodiment of the present invention, there is provided a spindle motor including a rotating part in which a hub is coupled to a rotating shaft and a fixing part in which a sleeve is coupled to the rotating shaft, wherein the rotating shaft has a thrust hydrodynamic bearing part formed on a lower end thereof, the thrust hydrodynamic bearing part having a scroll groove formed therein.

The rotating shaft may further include a support formed on the lower end thereof, the support supporting the rotating shaft, and the thrust hydrodynamic bearing part may be formed in a micro-gap between the rotating shaft and the support.

The thrust hydrodynamic bearing part according to a first preferred embodiment of the present invention may have a continuous scroll groove formed therein.

The continuous scroll groove of the thrust hydrodynamic bearing part according to a second preferred embodiment of the present invention may be formed in plural so as to have start and end points each facing each other.

The thrust hydrodynamic bearing part according to a third preferred embodiment of the present invention may have a discontinuous scroll groove formed therein, wherein the discontinuous scroll groove has a plurality of openings.

The discontinuous scroll groove of the thrust hydrodynamic bearing part according to a fourth preferred embodiment of the present invention having the plurality of openings may be formed in plural so as to have start and end points each facing each other.

An inner circumferential surface of the sleeve and an outer circumferential surface of the shaft may have a radial hydrodynamic bearing part formed therebetween in a radial direction.

The rotating part may include: the rotating shaft; the hub fixed to an upper end of the rotating shaft; and a magnet fixed to an inner circumferential surface of the hub.

The fixing part may include: the sleeve rotatably supporting the rotating shaft; a bracket coupled to an outer circumferential surface of the sleeve; a stator coupled to an outer circumferential portion of the bracket; and a support supporting a lower portion of the rotating shaft and coupled to the sleeve.

DESCRIPTION OF THE PREFERRED EMBODIMENTS

Figure 1:
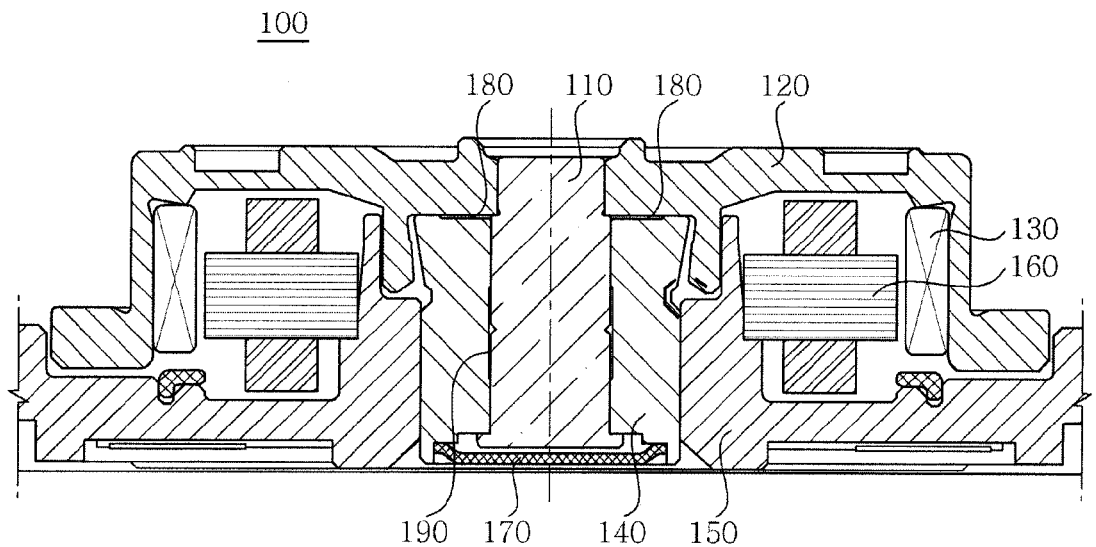
FIG. 1 is a cross-sectional view schematically showing the spindle motor according to the prior art.
Figure 2:
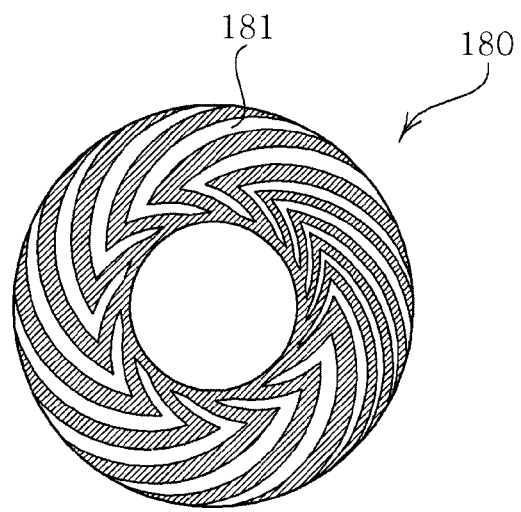
FIG. 2 is a cross-sectional view schematically showing a thrust bearing part of the spindle motor according to the prior art.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, a spindle motor according to preferred embodiments of the present invention will be described in detail with reference to the accompanying drawings.

Figure 3:
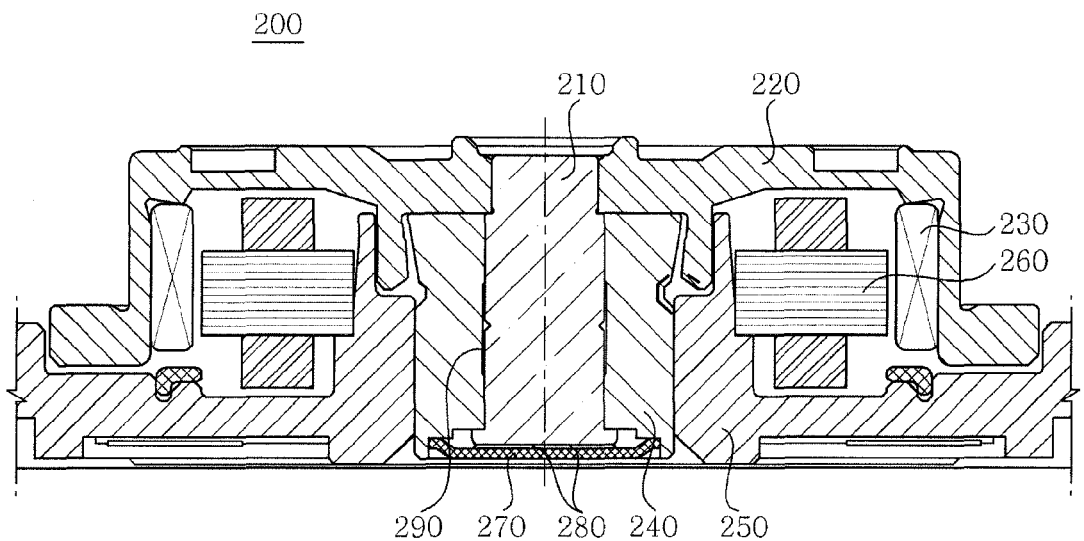
FIG. 3 is a cross-sectional view schematically showing a spindle motor according to a preferred embodiment of the present invention.

FIG. 3 is a cross-sectional view schematically showing a spindle motor according to the present invention. As shown in FIG. 3, the spindle motor 200 is configured to include a rotating part including a rotating shaft 210, a hub 220, and a magnet 230, and a fixing part including a sleeve 240, a bracket 250, a stator 260, and a support 270.

The rotating shaft 210 is rotatably supported by the sleeve 240 and has the hub 220 coupled thereto, and the hub 220 has the magnet 230 fixed to an inner circumferential surface thereof.

In addition, the sleeve 240 has the bracket 250 coupled to an outer circumferential surface thereof by press-fitting, adhesion, or the like, the bracket 250 has the stator 260 coupled to an outer circumferential portion thereof by press-fitting, adhesion, or the like, and the support 270 is coupled to the sleeve 240 while supporting the rotating shaft 210.

In the spindle motor 200 configured as described above, a micro-gap is formed between a lower portion of the sleeve 240 and an upper portion of the support 270 and is filled with oil as lubricating fluid, such that a thrust hydrodynamic bearing part 280 is formed.

In addition, a micro-gap is formed between an outer circumferential portion of the rotating shaft 210 and an inner circumferential portion of the sleeve 240 and is filled with oil as lubricating fluid, such that a radial hydrodynamic bearing part 290 is formed.

Figure 4:
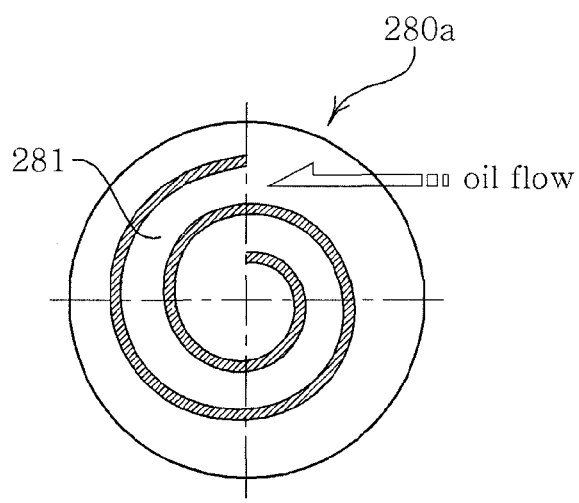
FIG. 4 is a cross-sectional view schematically showing a thrust hydrodynamic bearing part of a spindle motor according to a first preferred embodiment of the present invention.

The thrust hydrodynamic bearing part 280 has a scroll groove 281 formed therein, as shown in FIGS. 4 to 7. More specifically, FIG. 4 shows a thrust hydrodynamic bearing part 280a according to a first preferred embodiment, wherein a single continuous scroll groove 281 is formed therein. Through the above-mentioned configuration, the oil flows into the center of the bearing part, thereby making it possible to increase floating force of the rotating shaft.

Figure 5:
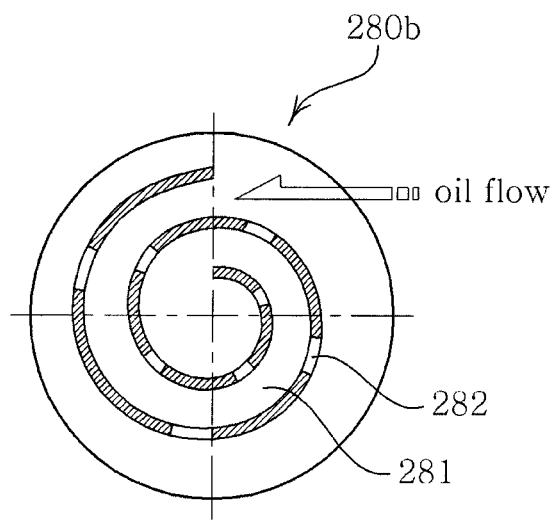
FIG. 5 is a cross-sectional view schematically showing a thrust hydrodynamic bearing part of a spindle motor according to a second preferred embodiment of to the present invention.

In addition, FIG. 5 shows a thrust hydrodynamic bearing part 280b according to a second preferred embodiment, wherein a discontinuous scroll groove 281 is formed therein, the discontinuous scroll groove 281 having a plurality of openings 282. Through the above-mentioned configuration, the oil naturally flows out through the openings 282 simultaneously with flowing into the center of the bearing part, thereby making it possible to more stably implement the hydrodynamic bearing part 280b.

Figure 6:
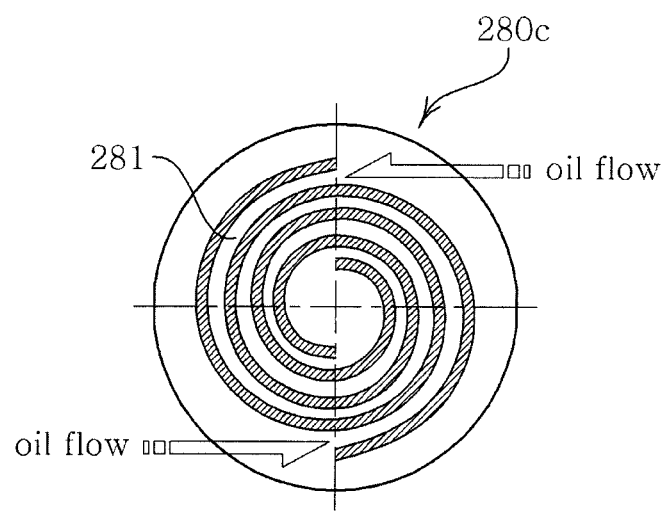
FIG. 6 is a cross-sectional view schematically showing a thrust hydrodynamic bearing part of a spindle motor according to a third preferred embodiment of the present invention.

Further, FIG. 6 shows a thrust hydrodynamic bearing part 280c according to a third preferred embodiment, wherein a plurality of scroll grooves 281 are formed therein, the plurality of scroll grooves 281 having start and end points each facing each other. Through the above-mentioned configuration, the oil flows into both sides of the bearing part, thereby making it possible to concentrate pressure and increase floating force of the rotating shaft.

Figure 7:
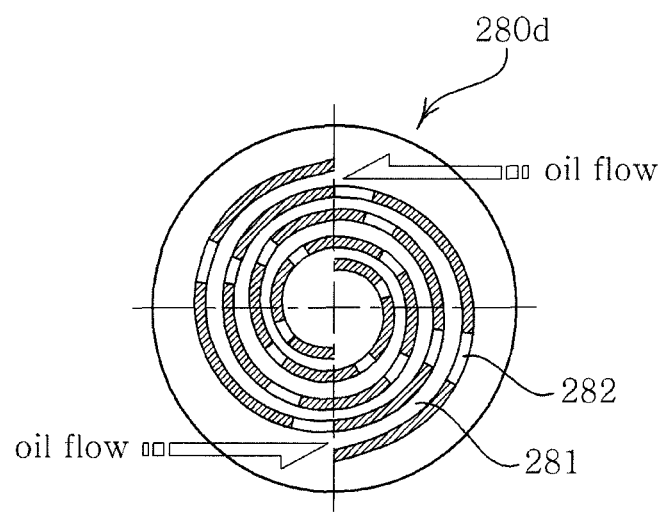
FIG. 7 is a cross-sectional view schematically showing a thrust hydrodynamic bearing part of a spindle motor according to a fourth preferred embodiment of the present invention.

Furthermore, FIG. 7 shows a thrust hydrodynamic bearing part 280d according to a fourth preferred embodiment, wherein a plurality of discontinuous scroll grooves 281 are formed therein, the plurality of discontinuous scroll grooves 281 having a plurality of openings 282 and having start and end points each facing each other. Through the above-mentioned configuration, the oil flows from both sides of the bearing part into the center thereof, thereby making it possible to increase floating force of the rotating shaft. Also, the oil naturally flows out through the openings 282 simultaneously with flowing from both sides of the bearing part into the center thereof, thereby making it possible to more stably implement the hydrodynamic bearing part 280.

According to the present invention, the thrust hydrodynamic bearing part of the spindle motor is formed in the micro-gap between the lower portion of the rotating shaft and the upper portion of the support to reduce frictional force, thereby making it possible to increase efficiency in power consumption, assembling accuracy is mitigated, thereby making it possible to increase a degree of freedom in design, the scroll groove is formed in the thrust hydrodynamic bearing part, thereby making it possible to solve problems of rotation unbalance and dynamic pressure unbalance.

Although the embodiment of the present invention has been disclosed for illustrative purposes, it will be appreciated that a spindle motor according to the invention is not limited thereby, and those skilled in the art will appreciate that various modifications, additions and substitutions are possible, without departing from the scope and spirit of the invention.

Accordingly, such modifications, additions and substitutions should also be understood to fall within the scope of the present invention.

What is claimed is:

1. A spindle motor including a rotating part in which a hub is coupled to a rotating shaft and a fixing part in which a sleeve is coupled to the rotating shaft,
wherein:
the sleeve rotatably supports the rotating shaft;
the fixing part comprises a support supporting a lower portion of the rotating shaft and coupled to the sleeve;
a thrust hydrodynamic bearing part is formed in a micro-gap between the lower portion of the rotating shaft and an upper portion of the support;
the rotating shaft has a thrust hydrodynamic bearing groove formed on a lower end thereof for forming the thrust hydrodynamic bearing part, or the support has a thrust hydrodynamic bearing groove formed on a upper end thereof for forming the thrust hydrodynamic bearing part, and
the thrust hydrodynamic bearing groove is rotated several times, has radius of gyration gradually decreasing from outside to inside thereof, and is a scroll groove with one start point and one ending point, and
the scroll groove has a plurality of openings between the one start point and the one ending point.

2. The spindle motor as set forth in claim 1, wherein the scroll groove of the thrust hydrodynamic bearing part is formed in plural so as to have start and end points each facing each other.

3. The spindle motor as set forth in claim 1, wherein a micro-gap is formed between an inner circumferential surface of the sleeve and an outer circumferential surface of the rotating shaft and is filled with oil as lubricating fluid, such that a radial hydrodynamic bearing part is formed.

4. The spindle motor as set forth in claim 1, wherein the rotating part includes:
the rotating shaft;
the hub fixed to an upper end of the rotating shaft; and
a magnet fixed to an inner circumferential surface of the hub.

5. The spindle motor as set forth in claim 1, wherein the fixing part further includes:
a bracket coupled to an outer circumferential surface of the sleeve; and
a stator coupled to an outer circumferential portion of the bracket.

* * * * *